United States Patent Office 3,218,261
Patented Nov. 16, 1965

3,218,261
METHOD OF MAKING A NEAR INFRARED ABSORBING COMPOSITION
Walter George Gall, Sheilbourne, Del., assignor to E. I. du Pont de Nemours and Company, Wilmington, Del., a corporation of Delaware
No Drawing. Filed Mar. 6, 1962, Ser. No. 177,726
2 Claims. (Cl. 252—300)

This invention relates to the use of infrared energy absorbers to reduce the heat transmission of constructions transparent to visible light.

Conventional vehicle windshields, rear windows, side glass panels, and ceiling glass panels transmit all wavelengths of light about equally. The sun emits electromagnetic radiation over a wide, continuous band of wavelengths stretching from the ultraviolet to the far infrared region. Because of attenuation by absorption by atmospheric water vapor, carbon dioxide and ozone, and because of scattering by atmospheric dust particles, only a relatively narrow band of wavelengths, from $0.29\mu$ to $2.1\mu$, penetrates to sea level on the earth. The intensity of this radiation is peaked sharply at $0.50\mu$, so that radiation in the region from $0.29\mu$ to $0.40\mu$, commonly called "near ultraviolet" comprises only 4% of the total solar energy reaching the earth with the remaining 96% being distributed almost equally between the visible ($0.40$–$0.75\mu$) and the near infrared areas ($0.75$–$2.1\mu$). Therefore, it can be seen that by selectively absorbing or reflecting the infrared while transmitting the visible light in vehicle windows, one can decrease the heating effect of the sun on the interior of such vehicles.

It is an object of this invention to provide a family of compounds which absorb infrared radiation to a greater degree than visible radiation.

This invention has as a further object the provision of an infrared absorber which can be incorporated into the interlayer of safety-glass, which may be any polyvinyl acetal, although polyvinyl butyral is preferable.

These objects are accomplished by the following invention in which an iron cyanide complex is incorporated in the polyvinyl butyral interlayer of safety-glass at a concentration of 0.01% to 5% by weight, based on the interlayer.

In the past, near infrared has been absorbed by transition metal ions, which are only weakly absorptive in the near infrared. Of these, the ferrous ion is highly selective, exhibiting little absorption of visible radiation. Two types of glass; namely, "Solex" (Pittsburgh Plate Glass Co.), and "EZ–I" (Libbey-Owens-Ford Glass Co.), contain metallic ions for the purpose of absorbing infrared radiation. When these types of glass are used to make standard windshields using two 120 mil glass layers and one 15 mil polyvinyl butyral interlayer, the resulting windshield transmits 69% of the incident visible radiation and 25% of the incident infrared radiation. These materials absorb radiation having wave lengths in the range of 0.70–$1.47\mu$. While these additives are suitable for the glass layer, they cannot be used in the interlayer which, being only $\frac{1}{17}$ the thickness of the glass, requires absorbers that are more efficient. In addition, these materials interact with the interlayer to the detriment of certain of its physical properties.

The invention involves the discovery of a large class of unusual cyanide-water complexes of iron which efficiently absorb infrared radiation over a broad range (0.75–$1.47\mu$) and which can be dispersed in polyvinyl butyral without disadvantageous side effects. These absorbers are fairly selective and transmit only one-half to one-third as much infrared radiation as visible solar radiation, when quantities of 0.05–0.2% by weight are added to polyvinyl butyral interlayers for safety-glass.

It has further been found that partial replacement of the complexed iron by manganese, ruthenium or cobalt yields products which are either soluble or of much smaller particle size and, therefore, yield more nearly haze-free mixtures with the interlayer. Some sacrifice in spectral properties results from this substitution, principally due to an increase in the transmission ratio of infrared radiation/visible radiation.

These iron cyanide complexes are subject to some deterioration over long time exposures to solar ultraviolet radiation, and this may be inhibited by the incorporation of known ultraviolet screens.

The infrared absorbers of this invention are preferably not employed over the entire automotive windshield area because they also reduce the transmission of visible radiation to a greater extent than is desirable. The absorbers of this invention are particularly well suited for high use in graduated bands in windshields, or over the entire area of side, rear and overhead glass areas where high transmission of visible radiation is not so critical. There are, of course, many other applications for these absorbers where it is necessary or desirable to reduce the amount of heat associated with the transmission of light. Such applications include architectural uses (windows, skylights), welders, goggles, sunglasses and sheets to place between the light source and the film in movie and slide projectors. Such infrared absorbers also can be used to improve the efficiency of devices intended for the trapping and storage of solar radiation and for the conversion of solar energy to other forms of energy.

Since organic infrared absorbers have been found to be unstable, and, since salts of transition metals absorb infrared weakly, it was found necessary to develop an absorber which functioned by means of an electron transfer mechanism. Only this latter type of absorber has been found to be efficient enough to be useful in practical applications. The absorber used in this invention is of the electron transfer type and is an iron cyanide derived from Prussian Blue (ferric ferrocyanide). Prussian Blue has an absorption band principally in the visible region, but by adjusting the ion ratio of $FE^{+++}/FE^{++}$, it has been found possible to shift the absorption range into the infrared region.

The basic infrared absorber of this invention can be formed by mixing equimolar portions of an alkali metal ferricyanide and a ferric salt, which yields a red-brown solution apparently containing ferric ferricyanide,

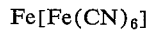
$$Fe[Fe(CN)_6]$$

Upon standing or heating of this solution, a green color is developed and a precipitate is formed. The precipitate is filtered off, washed and dried in a vacuum oven producing products ranging in color from blue to green, depending on the concentration of reactants and the heating time and temperature.

Although the above-formed product is insoluble in polyvinyl butyral, it is readily dispersed, for example, upon milling with the polyvinyl butyral. Such a procedure yields a blue mixture which exhibits some red haze. A glass laminate containing a 15 mil film containing 0.1% by weight of the absorber has a strong infrared absorption maximum at 1000 m$\mu$ (6% transmission), and accompanied by a high visible transmission maximum at 500 m$\mu$ (54% transmission). What is even more unprecedented is the infrared absorption bandwidth of 880 m$\mu$, completely covering the entire area of high solar intensity. The breadth of this absorption band averages 900 m$\mu$ for other preparations of the invention, as disclosed in the following examples. This breadth is about six times that of ordinary electronic absorption bands. The average spectral transmission for a 0.1% by weight concentration of the iron cyanide complex of this invention in a 15 mil polyvinyl butyral safety-glass laminate is 19.8% transmission of total solar radiation, 27.6% transmission of visible radiation, and 11.5% transmission of the near infrared radiation. For a similar laminate, containing 0.2% of the complex in the 15 mil polyvinyl butyral layer of the foregoing, transmission percentages are 9.8% of total solar radiation, 14.7% of the visible radiation, and 4.5% of the near infrared radiation.

A superior product is obtained if the mixture resulting from the addition of ferric salt to ferricyanide solution is heated rather than allowed to convert to the green form at room temperature. The infrared absorber is fully developed after 30 minutes at 90° C. Longer periods produce little additional improvement. The mole ratio of ferric salt/ferricyanide determines the product that is obtained. At a mole ratio of 0.9–1.1, the preferred blue-green product is obtained. This product is thermochromic and is green at room temperature and blue at temperatures above about 50° C. When dispersed in a polyvinyl acetal, it is generally blue at room temperature. At a mole ratio of 0.8–0.9, a purple infrared absorber is produced which is not thermochromic. At a mole ratio of 1.2 a blue product is produced which is not thermochromic and which is still a good absorber in the near infrared region. At a mole ratio of 1.33, a purple solid is obtained which is not thermochromic and which is not an infrared absorber.

The preferred product is obtained by adding the ferricyanide solution to the ferric salt solution at room temperature. If the solutions are heated to 55° C. before mixing and then heated for one hour at 90° C., after mixing, a green product which is not thermochromic is obtained. Although such a product forms a blue dispersion in polyvinyl butyral, it is different from the preferred product in having a shorter wavelength infrared absorption maximum (820 m$\mu$), and a narrower absorption bandwidth (740 m$\mu$).

Solutions of the reactants which are mixed at room temperature and then heated at 90° C. for longer periods (up to 17 hours) also yield the preferred absorbers. However, if these solutions are refluxed for 4 hours or longer, a blue product which is not thermochromic is obtained. This product has about the same infrared absorption characteristics as does the preferred product.

The preferred aqueous concentrations of ferric salt and ferricyanide are 0.5–1.0 molar. If the concentration of the reactants is below 0.2 molar, the product has a lower wavelength absorption maximum (900 m$\mu$) and a narrower bandwidth (730 m$\mu$) than the preferred product.

In addition, such a product is olive drab, rather than the thermochromic blue-green of the preferred product.

Other ferric salts, such as ferric nitrate, may be substituted for the preferred ferric chloride as may be seen from the following examples.

The previously discussed infrared absorbers are insoluble in polyvinyl acetals, including polyvinyl butyral, but are readily dispersible by milling with the polyvinyl acetal. Such dispersions generally produce a red haze. It is possible to product modifications of these absorbers which are relatively haze-free in polyvinyl butyral. These relatively haze-free absorbers are preferred in many applications. The unmodified absorbers have infrared absorption characteristics that are slightly more desirable than those of the relatively haze-free type and are preferred in many applications where red haze is not objectionable.

One way of producing a low-haze infrared absorber is to add about 10% by weight of concentrated HCl to the ferric salt solution, and then proceed as described above in the preparation of the basic infrared absorbers. This soluble product is less weather-resistant and has absorption properties considerably inferior to the dispersible product.

A preferred method for preparing low-haze infrared absorbers is to modify the above-described iron cyanide-water complexes with cobalt, ruthenium or manganese. These modifiers conveniently are incorporated into the ferric salt solution by adding $CoCl_2$, $RuCl_3$ or $MnCl_2$. Salts other than the chlorides may be used, but the chlorides are generally most convenient.

Specific examples for forming the infrared absorbers of this invention are given in Table I. In Table I all light transmission figures are based on 0.1% by weight of the absorber product dispersed or dissolved in a 15 mil safety-glass interlayer of polyvinyl butyral. All concentrations are given in millimoles of the components of moderately concentrated aqueous solutions (approximately one molar concentration), unless otherwise stated.

*Table I*

| Example No. | Solution A added to Solution B, Millimoles | Solution B, Millimoles | Heating Conditions | Product Yield, Grams |
|---|---|---|---|---|
| 1 | 10 $K_3Fe(CN)_6$ | 10 $FeCl_3$, Trace $K_2S_2O_8$ | 1 hr. steam bath | |
| 2 | 20 $K_3Fe(CN)_6$ | 20 $FeCl_3$ | 1 hr. room temperature | 1.4 |
| 3 | 10 $K_3Fe(CN)_6$ | 10 $FeCl_3$ | 1 hr. steam bath | 2.9 |
| 4 | 10 $K_3Fe(CN)_6$ | 10 $FeCl_3$, Trace $K_2S_2O_8$ | 1 hr. room temperature | 1.1 |
| 5 | 10 $K_3Fe(CN)_6$ | 10 $FeCl_3$, Trace $K_2S_2O_8$ | 1 hr. steam bath | 3.0 |
| 6 | 10 $K_3Fe(CN)_6$ | 10 $Fe(NH_4)(SO_4)_2$ | do | 0.05 |
| 7 | 10 $FeCl_3$ | 10 $K_3Fe(CN)_6$ | do | 2.8 |
| 8 | 10 $K_3Fe(CN)_6$ | 10 $FeCl_3$ | Mixed warm 1 hr. steam bath | 1.25 |
| 9 | 10 $FeCl_3$ | 10 $K_3Fe(CN)_6$ | 17 hrs. steam bath | 2.7 |
| 10 | 10 $FeCl_3$ | 10 $K_3Fe(CN)_6$ | 15 min. steam bath | 2.3 |
| 11 | 40 $K_3Fe(CN)_6$ | 40 $Fe(NH_4)(SO_4)_2$ | Mixed warm 4 hrs. steam bath | 6.4 |
| 12 | 20 $K_3Fe(CN)_6$ | 20 $Fe(NH_4)(SO_4)_2$ | 5.5 hrs. reflux | 5.2 |
| 13 | 20 $K_3Fe(CN)_6$ | 20 $FeCl_3$, in 3 ml. 1:1 HCl | 1 hr. steam bath | 0.7 |
| 14 | 20 $K_3Fe(CN)_6$ | 18 $FeCl_3$ in conc. HCl | do | 5.4 |
| 15 | 10 $K_3Fe(CN)_6$ | 9.7 $FeCl_3$, 0.3 $CoCl_2$ | do | 1.9 |
| 16 | 10 $K_3Fe(CN)_6$ | 9.7 $FeCl_3$, 0.3 $MnCl_3$ | do | 2.5 |
| 17 | 10 $K_3Fe(CN)_6$ | 9.5 $FeCl_3$, 0.5 $CoCl_3$ | do | 2.3 |
| 18 | 10 $K_3Fe(CN)_6$ | 9.5 $FeCl_3$, 0.5 $[Co(NH_3)_5(H_2O)]Cl_3$ | do | 2.6 |
| 19 | 10 $K_3Fe(CN)_6$ | 9.5 $FeCl_3$, 0.5 $RuCl_3$ | do | 2.8 |
| 20 | 10 $K_3Fe(CN)_6$ | 9.5 $FeCl_3$, 0.5 $MnCl_2$ | do | 3.1 |
| 21 | 10 $K_3Fe(CN)_6$ | 9.2 $FeCl_3$, 0.3 $CoCl_2$, 0.5 $RuCl_3$ | do | 1.7 |
| 22 | 10 $K_3Fe(CN)_6$ | 9.8 $FeCl_3$, 0.2 $CoCl_3$ | do | 2.7 |
| 23 | 10 $K_3Fe(CN)_6$ | 9.6 $FeCl_3$, 0.2 $CoCl_2$, 0.2 $[Co(NH_3)_5(H_2O)]Cl_3$ | do | 2.4 |
| 24 | 10 $K_3Fe(CN)_6$ | 9.35 $FeCl_3$, 0.25 $CoCl_2$, 0.4 $[Co(NH_3)_5(H_2O)]Cl_3$ | do | 2.3 |
| 25 | 10 $K_3Fe(CN)_6$ | 8.5 $FeCl_3$, 1.5 $MnCl_2$ | do | 1.9 |
| 26 | 10 $K_3Fe(CN)_6$ | 9 $FeCl_3$, 1 $RuCl_3$ | do | 2.4 |
| 27 | 10 $K_3Fe(CN)_6$ | 7.5 $FeCl_3$, 2.5 $MnCl_2$ | do | 2.5 |
| 28 | 10 $K_3Fe(CN)_6$ | 6 $FeCl_3$, 4 $MnCl_2$ | do | 1.5 |
| 29 | 10 $K_3Fe(CN)_6$ | 9.5 $FeCl_3$, 0.5 $[Co(NH_3)_6]Cl_3$ | do | 2.8 |
| 30 | 10 $K_3Fe(CN)_6$, 15 ml. $H_2O$ | 8 $FeCl_3$, 2 $MnCl_2$, 15 ml. $H_2O$ | do | 2.7 |
| 31 | 10 $K_3Fe(CN)_6$, 40 ml. $H_2O$ | 8 $FeCl_3$, 2 $MnCl_2$, 40 ml. $H_2O$ | do | 2.5 |
| 32 | 10 $K_3Fe(CN)_6$, 25 ml. $H_2O$ | 8 $FeCl_3$, 2 $[Co(NH_3)5Cl]Cl_2$ | do | 2.4 |
| 33 | 10 $K_3Fe(CN)_6$, 25 ml. $H_2O$ | 9.7 $FeCl_3$, 0.3 $CoF_2$, 25 ml. $H_2O$ | do | 2.4 |
| 34 | 10 $K_3Fe(CN)_6$, 10 ml. $H_2O$ | 8.7 $FeCl_3$, 1.3 $MnCl_2$, 10 ml. $H_2O$ | 1 hr. reflux | 2.6 |

Table I—Continued

| Example No. | Product Color | Haze Level[1] in Polyvinyl Butyral | Peak Visible Transmission | | Infrared Minimum Transmission | | Absorption Bandwidth, mμ | Solar Transmission | | |
|---|---|---|---|---|---|---|---|---|---|---|
| | | | mμ | Percent Trans. | mμ | Percent Trans. | | Percent Visible | Percent Infrared | Percent Total |
| 1 | | High | 500 | 56 | 880 | 10.5 | 570–1,400 | 31.6 | 15.8 | 23.9 |
| 2 | Blue | do | 500 | 64 | 1,000 | 23.5 | 580–1,510 | 43.8 | 25.6 | 35.0 |
| 3 | Blue-green | do | 500 | 54.5 | 1,060 | 8 | 560–1,470 | 28.3 | 12.0 | 20.4 |
| 4 | Blue | do | 500 | 62.5 | 1,200 | 18 | 590–1,490 | 41.9 | 23.8 | 33.1 |
| 5 | Blue-green | do | 500 | 52.5 | 1,150 | 8 | 570–1,500 | 27.6 | 11.5 | 19.8 |
| 6 | Green | do | 500 | 65 | 970 | 10.5 | 570–1,240 | 36.6 | 17.8 | 27.5 |
| 7 | Blue-green | do | 500 | 62.5 | 1,050 | 11 | 570–1,470 | | | |
| 8 | Green | do | 490 | 63 | 820 | 7 | 570–1,310 | 32.9 | 11.3 | 23.8 |
| 9 | Blue-green | do | 490 | 63.5 | 1,000 | 8.5 | 560–1,400 | | | |
| 10 | Green | do | 500 | 54 | 1,000 | 6 | 570–1,450 | | | |
| 11 | Light green | do | 490 | 67 | 1,000 | 19 | 580–1,380 | 44.8 | 26.0 | 35.6 |
| 12 | Light blue | Low | 460 | 43 | 820 | 30 | 610–1,260 | | | |
| 13 | Blue | do | 470 | 50 | 740 | 12 | 570–1,000 | | | |
| 14 | Blue-green | do | 480 | 60.5 | 740 | 1.7 | 560–1,090 | 27.3 | 20.8 | 24.1 |
| 15 | Green | do | 490 | 55 | 790 | 1.5 | 560–1,150 | 22.8 | 15.4 | 19.2 |
| 16 | do | High | 500 | 55.5 | 900 | 6 | 570–1,380 | | | |
| 17 | Blue-green | Low | 470 | 53 | 750 | 1.5 | 560–1,130 | 23.7 | 19.6 | 21.7 |
| 18 | Green | High | 500 | 48 | 900 | 4 | 560–1,420 | 23.1 | 9.6 | 16.6 |
| 19 | Blue-green | do | 490 | 51.5 | 900 | 5 | 560–1,380 | 24.7 | 11.8 | 18.4 |
| 20 | Green | Low | 490 | 60 | 820 | 6 | 580–1,150 | 31.8 | 20.3 | 26.2 |
| 21 | Blue | do | 470 | 57 | 750 | 4.5 | 560–1,080 | | | |
| 22 | Green | do | 490 | 62.5 | 800 | 5 | 570–1,240 | 31.4 | 17.9 | 24.8 |
| 23 | Blue-green | do | 480 | 61.5 | 780 | 2.5 | 560–1,220 | | | |
| 24 | Green | do | 500 | 45 | 800 | 0 | 560–1,280 | 18.0 | 11.3 | 14.7 |
| 25 | Blue-green | Medium | 500 | 52.5 | 900 | 5 | 580–1,330 | 27.4 | 14.0 | 20.9 |
| 26 | Green-blue | Low | 480 | 56 | 750 | 1.5 | 560–1,230 | 24.6 | 16.3 | 20.6 |
| 27 | Blue-green | do | 490 | 54 | 830 | 4.5 | 570–1,250 | 27.4 | 17.1 | 22.4 |
| 28 | do | do | 500 | 61 | 800 | 6 | 580–1,220 | 33.3 | 21.3 | 27.5 |
| 29 | Green | High | 500 | 60 | 1,050 | 11.5 | 570–1,470 | 34.3 | 16.4 | 25.6 |
| 30 | Blue-green | do | 500 | 51.5 | 880 | 3 | 570–1,320 | 24.4 | 12.3 | 18.5 |
| 31 | do | do | 510 | 50 | 1,020 | 7.5 | 590–1,450 | 29.1 | 13.3 | 21.4 |
| 32 | Green | do | 510 | 46 | 850 | 6.5 | 590–1,300 | 27.6 | 15.0 | 21.4 |
| 33 | do | Low | 480 | 60 | 810 | 5 | 560–1,250 | 29.3 | 17.4 | 23.1 |
| 34 | Bluish purple-green | do | 480 | 59.5 | 880 | 6 | 550–1,310 | 28.1 | 15.8 | 22.5 |

[1] As measured by Gardiner Hazemeter. "High" indicates a value greater than approximately 10%, while "Low" is less than 10%.

As can be seen from the examples, the unmodified complexes generally have superior infrared properties. The manganese-modified product was considered the best of the low haze absorbers. The preferred range of manganese is from 1 to 40 atom percent, based on total metal content, with 15 to 20 atom percent being especially preferred. Manganese-modified absorbers are preferred because, upon weathering, their transmission of visible radiation improves (about +12%) with little change (about −1.5%) in their infrared absorption. On the other hand, all the absorbers which were tested for weatherability deteriorated to at least a small degree, as judged from the fact that the difference between their infrared transmission and their visible transmission became smaller after weathering. Resistance to weathering can be improved by incorporating an ultraviolet light absorber. This can be coated on the polyvinyl butyral sheet or incorporated in the sheet along with the infrared absorber. Still another alternative may be employed if two interlayers are to be employed in a single safety-glass laminate; namely by incorporating the ultraviolet absorber in one interlayer while incorporating the infrared absorber in the other interlayer. Suitable ultraviolet absorbers are "Tinuvin" P, "Cyanosorb" UV-24 or nickel dibutyldithiocarbamate at concentrations of approximately 1–2% by weight of the interpolymer. "Tinuvin" P has the chemical structure

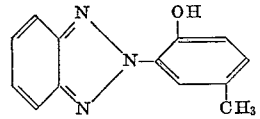

"Cyanosorb" UV-24 has the chemical structure

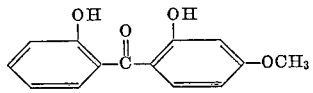

Nickel dibutyldithiocarbamate has the chemical structure

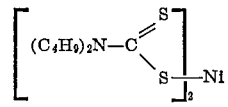

Safety-glass panels which contain the infrared absorbers of this invention in the polyvinyl butyral interlayer are formed in the conventional way and have structural properties similar to safety-glass which contains no infrared absorber.

Analysis of the preferred, unmodified iron complex infrared absorbers yields values in the range

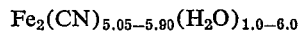

while the cobalt, ruthenium and manganese modified iron cyanide complexes lie in the range

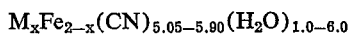

where $x$ may have a value between 0 and 0.4 and M is Mn, Ru or Co. The very best absorbers have 5.2 to 5.5 cyanide groups per two metal atoms.

I claim:
1. A method of making a near infrared absorbing composition which comprises the steps of mixing an aqueous solution of an alkali metal ferricyanide with an aqueous solution of a ferric salt, said solutions being about from 0.5 to 1.0 molar, and the mole ratio of ferric salt/ferricyanide being from 0.8 to 1.2, heating the thus formed solution at from about 90° C. to the reflux temperature, for from when a precipitate is formed up to about 17 hours, separating the thus formed precipitate from the aqueous phase by filtration, and drying said precipitate to obtain the near infrared absorbing composition.

2. A method of making a near infrared absorbing composition which comprises the steps of mixing an aqueous solution of an alkali metal ferricyanide with an aqueous solution of a ferric salt and up to 40 mole percent based on the moles of alkali metal ferricyanide present of a salt of an element selected from the group consisting of cobalt, ruthenium, and manganese, said solutions being about from 0.5 to 1.0 molar, and the mole ratio of said salts/ferricyanide being from 0.8 to 1.2, heating the thus formed solution at from about 90° C. to the reflux temperature, for from when a precipitate is formed up to about 17 hours, separating the thus formed precipitate from the aqueous phase by filtration, and drying said precipitate to obtain the near infrared absorbing composition.

References Cited by the Examiner

UNITED STATES PATENTS

| | | | |
|---|---|---|---|
| 1,504,465 | 8/1924 | Douglass | 252—300 XR |
| 2,020,861 | 11/1935 | van der Willigen et al. | 252—300 XR |
| 2,232,806 | 2/1941 | Ryan | 154—2.77 |
| 2,479,501 | 8/1949 | Marks | 260—73 XR |
| 2,636,420 | 4/1953 | Ryan et al. | 154—2.77 XR |
| 2,697,037 | 12/1954 | Jelley et al. | 117—33.3 XR |

OTHER REFERENCES

Hackh's Chemical Dictionary, Second edition, Blakiston's Son & Co. Inc., Philadelphia, Pennsylvania, 1937, pages 761 and 966.

JULIUS GREENWALD, *Primary Examiner.*